United States Patent
Brikho

(10) Patent No.: US 7,552,004 B2
(45) Date of Patent: Jun. 23, 2009

(54) ROAD HAZARD AUTOMATIC VEHICLE SPEED CONTROL

(76) Inventor: Ghassan Brikho, 28076 Universal Dr., Warren, MI (US) 48092

( * ) Notice: Subject to any disclaimer, the term of this patent is extended or adjusted under 35 U.S.C. 154(b) by 435 days.

(21) Appl. No.: 11/400,443

(22) Filed: Apr. 7, 2006

(65) Prior Publication Data

US 2007/0239341 A1 Oct. 11, 2007

(51) Int. Cl.
*B60T 8/32* (2006.01)
(52) U.S. Cl. .................. 701/93; 701/29; 701/33; 701/36; 340/426.13; 342/357.1
(58) Field of Classification Search .................. 701/29, 701/33, 36, 93; 340/426.13, 426.16, 438; 342/357.1
See application file for complete search history.

(56) References Cited

U.S. PATENT DOCUMENTS

| | | | |
|---|---|---|---|
| 5,530,651 A | 6/1996 | Uemura et al. | 364/461 |
| 6,112,152 A * | 8/2000 | Tuttle | 701/115 |
| 6,952,156 B2 | 10/2005 | Arshad et al. | 340/5.6 |
| 7,333,012 B1 * | 2/2008 | Nguyen | 340/539.1 |
| 2001/0025218 A1 * | 9/2001 | Shimada et al. | 701/86 |
| 2005/0027415 A1 | 2/2005 | Iwazaki et al. | 701/36 |
| 2005/0134440 A1 | 6/2005 | Breed | 340/435 |
| 2005/0267658 A1 | 12/2005 | Yuan et al. | 701/36 |

* cited by examiner

*Primary Examiner*—Gertrude Arthur Jeanglaud
(74) *Attorney, Agent, or Firm*—Gifford, Krass, Sprinkle, Anderson & Citkowski, P.C.

(57) ABSTRACT

Systems and processes for automatically bringing a vehicle into compliance with a regulation are provided in order to control for unusual situations, inexperience, reduced ability, and willful disregard by a vehicle operator. An inventive system includes a signal receiver for wirelessly receiving a signal directed specifically to the motorized vehicle while the vehicle is in operation. The signal pertains to a regulation and or emergency command. For example, a signal contains speed limit information and comparison of a parameter of vehicle operation with the requirements of the regulation allows determination of whether the vehicle is in compliance with the regulation. A signal may also include a command by an authority directing the vehicle to slow down or stop, such as in an emergency situation. Where the vehicle is not in compliance with the regulation or command, a control signal is sent to an effector to bring the vehicle into compliance.

18 Claims, 3 Drawing Sheets

ROAD HAZARD AUTOMATIC VEHICLE SPEED CONTROL

FIELD OF THE INVENTION

The invention relates generally to systems and methods for enforcement of regulations pertaining to vehicles. In particular, the invention relates to systems and methods for automatically bringing a vehicle into compliance with a regulation or command.

BACKGROUND OF THE INVENTION

Vehicle operators who are either ignorant of regulations applicable in a particular situation or those who willfully ignore such regulations are a primary cause of vehicular accidents. Nearly one-third of fatal traffic accidents occurring in 2004 involved vehicle speeds in excess of the mandated speed limit. (National Center for Statistics and Analysis, "Traffic Safety Facts: 2004 Data")

Ignorance often contributes to accidents where both conditions and regulations are atypical. For example, many accidents occur in construction zones, where traffic regulations may differ from those outside such zones. Traffic regulation violation may occur due to combinations of unfamiliar road configurations, congested traffic and unusual road signs.

Lack of familiarity with regulations and conditions is also a common contribution to accidents where drivers are inexperienced. Such inexperience is generally a factor pertaining to vehicles operated seasonally, such as boats and snowmobiles.

Diminished ability to operate a vehicle can also contribute to accidents. It is well-known that alcohol or other drug use is a major factor in many vehicle accidents. Ability to operate a vehicle in compliance with regulations may also be reduced by illness, injury or advanced age.

One of the most dangerous situations encountered on a roadway involves inappropriate response of a driver to the approach of an emergency vehicle. For instance, some drivers fail to slow down or pull-over when an emergency vehicle displaying emergency lights and/or sounding a siren approaches from ahead or behind. Also, some drivers respond to the approach of a police vehicle by speeding up and attempting to elude the police, resulting in a highly dangerous high-speed chase by law enforcement officers.

While education, threat of loss of licensure, and threat of fine and imprisonment should logically highly motivate operators to learn and follow regulations and emergency commands, the reality is that accidents occur even in the face of such severe possible consequences.

Thus, there is a continuing need for systems and methods for bringing a vehicle into compliance with a regulation or emergency command automatically in order to control for unusual situations, inexperience, reduced ability, and willful disregard by a vehicle operator.

SUMMARY OF THE INVENTION

A system is provided by the present invention for automatically bringing a motorized vehicle into compliance with a motorized vehicle regulation. Such regulations include laws and emergency commands issued by an authorized person. An inventive system includes a signal receiver disposed in contact with a motorized vehicle. The signal receiver is adapted to receive a signal directed specifically to the motorized vehicle from a signal emitter device. The signal preferably contains data relating to a motorized vehicle regulation and/or emergency command.

An inventive system further includes an electronic device, such as a computer, disposed in contact with the motorized vehicle. The electronic device is in data communication with the receiver and includes data input and output capacity, processing circuitry, and memory circuitry. The electronic device also includes an executable program for analysis of the signal data to determine whether the motorized vehicle is in compliance with the motorized vehicle regulation in one embodiment. The electronic device is configured to generate a control signal for controlling an effector responsive to the control signal, thereby automatically bringing the motorized vehicle into compliance with the motorized vehicle regulation.

A signal receiver included in an inventive system may be any of various types of receivers capable of wirelessly receiving a data signal. Optionally a global positioning system receiver or a radio frequency identification reader is included in an inventive system for receiving a signal pertaining to a vehicle regulation.

One or more signal emitter devices is optionally included in an inventive system. An included signal emitter is positioned so as to be in signal communication distance from a vehicle intended to receive the signal. A signal emitter is configured to emit a signal directed specifically to a particular motorized vehicle and is preferably disposed in an emergency vehicle such as a police vehicle, an ambulance, a fire response vehicle or a government agency vehicle.

Radio frequency identification technology may be included in a system according to the present invention such that an included signal emitter device includes a radio frequency identification tag and a signal receiver includes a radio frequency identification reader. In a further embodiment, an included signal emitter device includes a radio frequency identification reader and a signal receiver includes a radio frequency identification tag.

A process for automatically bringing a motorized vehicle into compliance with a motorized vehicle regulation and/or command is provided by the present invention. An inventive process includes receiving a signal directed specifically to a particular motorized vehicle in a signal receiver in contact with the motorized vehicle. The signal transmits data relating to a motorized vehicle regulation and/or command. The signal receiver is in data communication with an electronic device, such as a computer, disposed in contact with the motorized vehicle. The electronic device has data input and output capacity, processing circuitry, and memory circuitry. The electronic device also includes an executable program for analysis of the signal data to determine whether the motorized vehicle is in compliance with a particular motorized vehicle regulation and/or command. Where it is determined that the motorized vehicle is not in compliance with the regulation and/or command, the electronic device generates a control signal effective to activate an effector, thereby automatically bringing the motorized vehicle into compliance with the motorized vehicle regulation and/or command.

A system is provided for automatically controlling a motorized vehicle which is not on a public road. Such a system may be used for motorized vehicles not intended for use on conventional roads, such as novelty cars and snowmobiles. Such a system may also be applied for use in conjunction with marine motorized vehicles, such as boats and jet skis.

A system according to the present invention may include a signal receiver disposed in contact with an off-road motorized vehicle for receiving a signal directed specifically to the particular off-road motorized vehicle from the signal emitter device. The signal may contain data relating to a hazard or restricted area. An electronic device is provided which is disposed in contact with the off-road motorized vehicle, the electronic device in data communication with the signal receiver, the electronic device having data input and output capacity, processing circuitry, memory circuitry and an executable program for analysis of the data from the signal emitter device to determine whether the motorized vehicle is in the vicinity of the hazard or restricted area. The electronic device is configured to generate a control signal where the vehicle is determined to be in the vicinity of the hazard or restricted area and signal an effector for responsive to the control signal, so that effector response to the control signal automatically controls the off-road motorized vehicle and the vehicle avoids the hazard or restricted area. Examples of off-road motorized vehicles include a marine vehicle, a wheeled off-road vehicle and a snowmobile.

DETAILED DESCRIPTION OF THE INVENTION

Figure 1:
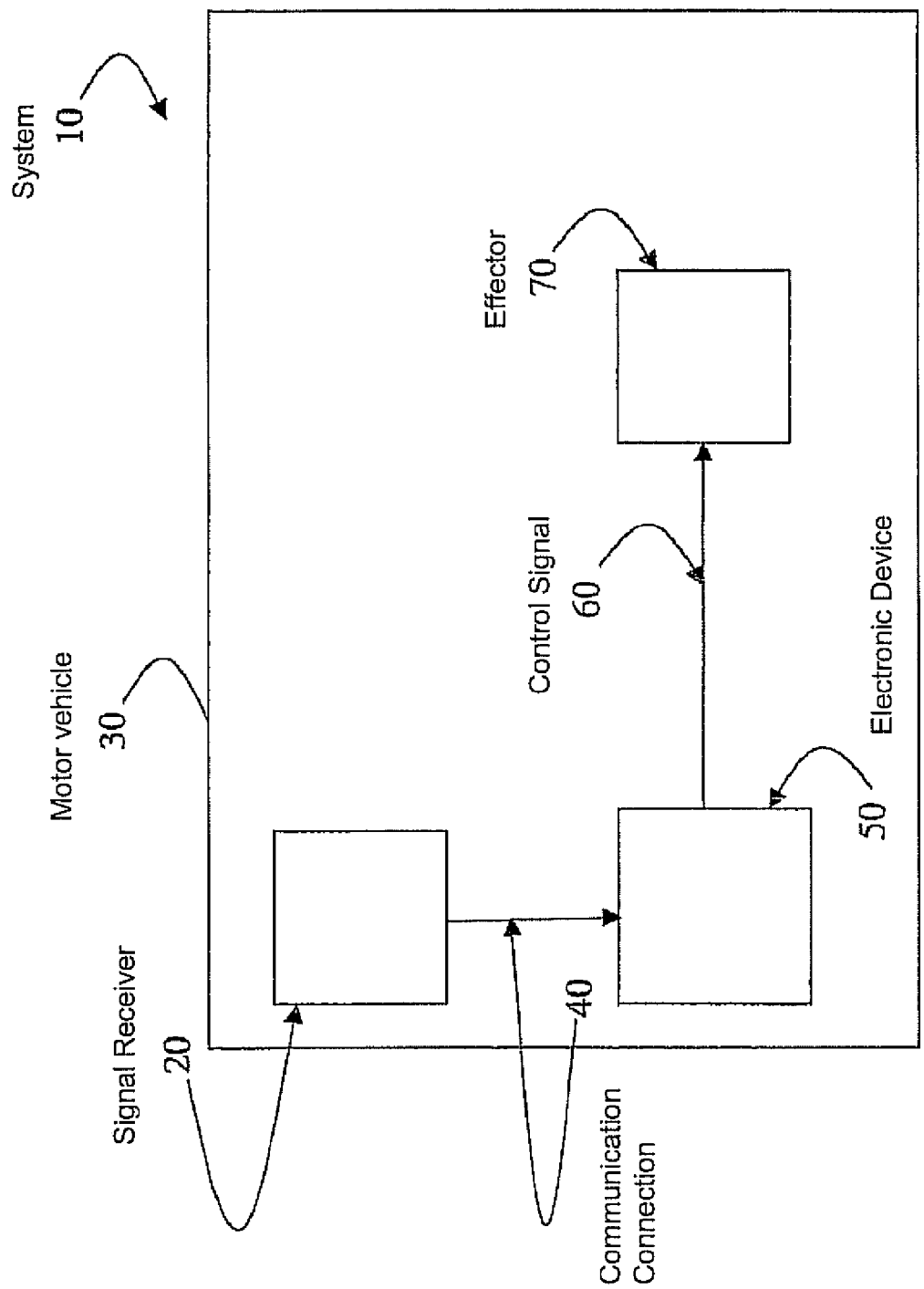
FIG. 1 is a schematic diagram illustrating an embodiment of an inventive system including a signal receiver and an electronic computer.

A system for automatically bringing a motorized vehicle into compliance with a motorized vehicle regulation and/or command is provided. An inventive system includes a signal receiver for wirelessly receiving a signal from a signal emitter. The signal receiver is positioned in or on the motorized vehicle so that the signal can be received while the vehicle is in operation.

The signal contains data relating to a motorized vehicle regulation in one embodiment. Optionally, such a signal contains information relating to the presence of a hazard or restricted area. A vehicle regulation may be a public regulation, such as a traffic law, or a private regulation, such as a rule imposed on a commercial vehicle driver by a private enterprise. For instance, the signal may include data such as speed limit in the area near the signal emitter. Alternatively, the signal may contain position data which may be used to access information about motorized vehicle information pertaining to the current vehicle position, such as a speed limit.

In a further option, the signal may relate to emergency information and/or an emergency command. Such emergency information may relate to the approach of an emergency vehicle for instance. An emergency command may include a command to slow or stop the vehicle.

A signal emitter is preferably disposed in an emergency vehicle such as a police vehicle, an ambulance, a fire response vehicle or a government agency vehicle. A signal emitted from a signal emitter disposed in an emergency vehicle is specifically directed to a second specific vehicle. For instance, a signal is directed to a specific vehicle in order to control the speed of the vehicle, such as where speed limit enforcement is appropriate. In other situations, a signal is directed to a specific vehicle in order to control the speed of the vehicle in an emergency, such that vehicle speed is controlled in order to allow for safe passage of an emergency vehicle, for example.

An electronic device in contact with the motorized vehicle is in data communication with the signal receiver in order to process the data and produce a control signal configured to bring the vehicle into compliance with a motor vehicle regulation and/or control the vehicle in response to emergency information and/or an emergency command. Such an electronic device has data input and output capacity, processing circuitry, memory circuitry and an executable program for producing a control signal to bring the motorized vehicle into compliance with the motorized vehicle regulation and/or control the vehicle in response to emergency information and/or an emergency command.

In a further option, an electronic device in contact with the motorized vehicle is in data communication with the signal receiver in order to process the data and produce a determination of whether the vehicle is in compliance with a particular motorized vehicle regulation or not. Such an electronic device has data input and output capacity, processing circuitry, memory circuitry and an executable program for analysis of the data from the signal emitter device to determine whether the motorized vehicle is in compliance with the motorized vehicle regulation.

The electronic device is optionally a component of an electronic engine controller or other vehicle computer.

A control signal is generated by the electronic device which is communicated to an effector. The effector responds to the control signal, directly or indirectly, to bring the motorized vehicle into compliance with the motorized vehicle regulation and/or control the vehicle in response to emergency information and/or an emergency command.

Inventive systems and methods may be used in conjunction with various types of vehicles including wheeled road vehicles, such as cars and trucks; marine vehicles, wheeled off-road vehicles, such as novelty cars; and non-wheeled land vehicles, such as snowmobiles.

FIG. 1 schematically illustrates a system 10 according to the present invention including a signal receiver 20 in contact with a motorized vehicle 30 for receiving a signal directed specifically to the motorized vehicle from a signal emitter device. An electronic device 50, such as a computer, is shown in communication connection 40 with the signal receiver 20. Such a communication connection may be a wireless or wired connection. As noted above, the electronic device 50 is adapted to generate a control signal 60 to communicate with an effector 70 for responding to the control signal 60.

In one embodiment, an inventive system includes a signal emitter device for emitting a signal containing data relating to a motorized vehicle regulation, emergency information and/ or an emergency command. Optionally, a signal emitter device emits a signal containing information relating to the presence of a hazard or restricted area.

Figure 2:
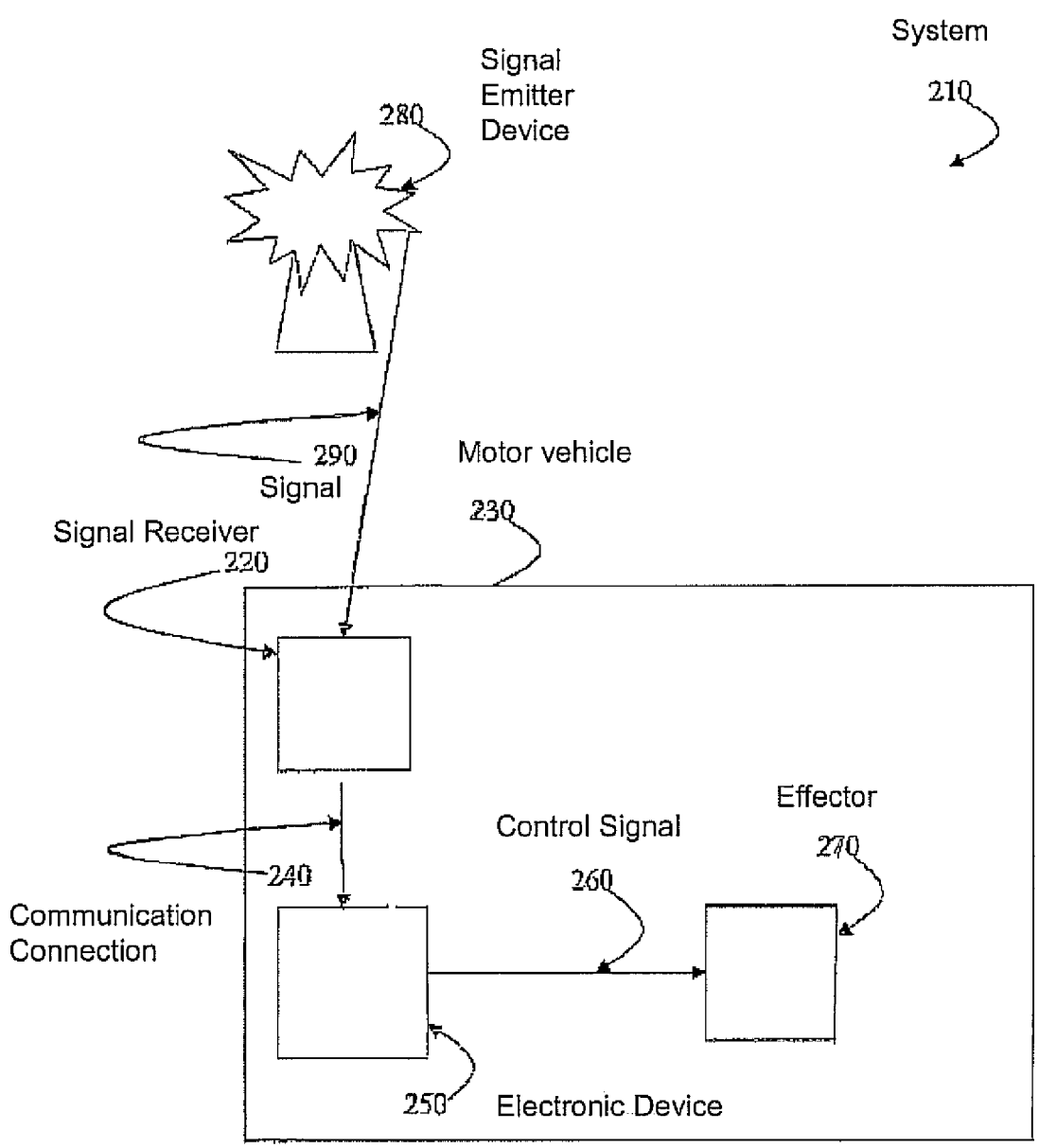
FIG. 2 is a schematic diagram illustrating an embodiment of an inventive system including a signal emitter, signal receiver, and an electronic computer.

FIG. 2 schematically illustrates an inventive system including a signal emitter device for emitting a signal containing data relating to a motorized vehicle regulation, emergency information and/or emergency command. Shown is a system 210 according to the present invention including a signal receiver 220 in contact with a motorized vehicle 230. An electronic device 250 is shown in communication connection 240 with the signal receiver 220. The electronic device 250 is adapted to generate a control signal 260 to communicate with an effector 270 for responding to the control signal 260. A signal emitter device 280 is shown emitting a signal 290 directed specifically to the motorized vehicle from the signal emitter device. The signal 290 is received by the signal receiver 220.

A signal emitter device and a signal receiver may be any type of device compatible with wireless communication between a stationary object and a moving object.

In one embodiment, a signal receiver is a global positioning system receiver configured to receive a satellite signal containing position data pertaining to the vehicle containing the receiver. In such a case, one or more satellites are signal emitters. Position data contained in the signal may be related to regulations pertaining to motorized vehicles. For instance, memory circuitry included in an electronic device described above may include a database containing motorized vehicle regulation information, such as speed limits, cross-referenced with specified locations.

In a preferred embodiment, a signal emitter and a signal receiver include radio frequency identification technology. For instance a signal emitter may include a radio frequency identification reader and a signal receiver may include a radio frequency identification tag. In a further option, a signal emitter may include a radio frequency identification tag and a signal receiver may include a radio frequency identification reader.

Various types of radio frequency identification tag and reader combinations may be used in an inventive system and/or process. Radio frequency identification tags may be passive tags which emit a signal containing data only in response to interrogation by a radio frequency identification reader. A passive tag is typically energized to transmit identification information by the radio frequency identification reader, such that a power source need not necessarily be included. However, passive tags optionally include an energy source, such as a battery.

Active radio frequency identification tags may also be used. These differ from passive tags in that they can initiate information transmission. Active tags are powered by an energy source, such as a battery, and may transmit continuously or intermittently.

Radio frequency identification tags may be read-only, read-write and/or rewriteable. Numerous radio frequency identification readers and tags have been developed illustratively including those described in U.S. Pat. Nos. 4,442,507; 4,796,074; 5,095,362; 5,296,722; 5,347,263; 5,347,280; 5,378,880; 5,407,851; 5,430,441; 5,528,222; 5,550,547; 5,521,601; 5,541,604; 5,565,846; 5,682,143; 5,625,341; 6,154,137; and 6,922,146.

In a preferred embodiment, a radio frequency identification signal emitter device is contained in an emergency vehicle, in contact with the emergency vehicle, in contact with the emergency vehicle operator and/or in contact with a passenger in the emergency vehicle. Such a signal emitter device for transmitting data relating to a motorized vehicle regulation, emergency information and/or emergency command addresses a signal specifically to a particular motorized vehicle.

In one embodiment of the present invention, a signal emitted from a signal emitter includes information relating to identification of a particular vehicle. Such a signal may be broadcast and received by a signal receiver in a plurality of vehicles. In one option, each signal receiver receiving the information includes processing and memory circuitry for comparison of the broadcast information relating to identification of a particular vehicle with information specific to the vehicle in which the receiver is contained. A comparison is performed, and, where the broadcast information relating to identification of a particular vehicle matches information specific to the vehicle in which the receiver is contained, a control signal pertaining to a vehicle regulation, emergency information and/or emergency command is generated. For example, a license plate number or other identifier may be input to a signal emitter as identification information relating to a particular vehicle. A signal receiver may be programmed to contain this identification information.

In a further embodiment, a signal from a signal emitter is directed to a particular vehicle by limitation of the range of signal emission, such that only a vehicle in the immediate vicinity of the emitter will receive the signal.

In further embodiments, an inventive system includes a plurality of signal emitter devices for transmitting a signal containing data relating to a motorized vehicle regulation, emergency information and/or an emergency command. In such an embodiment, the plurality of signal emitter devices may be located in contact with a plurality of emergency vehicles.

Inventive systems and processes are used in marine vehicles in one embodiment. One or more signal emitters may be positioned at sea, on lakes or on rivers, to assist vehicle operators in avoiding marine navigation hazards such as shoals, rocks, and high traffic areas. For instance, a signal emitter may be attached to a buoy.

Inventive systems and processes may also be used in conjunction with off-road terrestrial vehicles, such as snowmobiles. One or more signal emitters may be placed near hazards such as thin ice in order to protect vehicle operators.

As noted above, where it is determined that the motorized vehicle is not in compliance with the regulation, a control signal is generated by the electronic device which is communicated to an effector. The effector responds to the control signal, directly or indirectly, to bring the motorized vehicle into compliance with the motorized vehicle regulation. The effector may illustratively be a component of a fuel injection system, an ignition system, a braking system, an engine airflow intake system, or a combination of these or other effectors.

For example, in a direct injection spark ignited internal combustion engine having one or more combustion chambers, fuel injection is controlled by an electronic engine controller unit (ECU) conventional in the art. An ECU is a conventional computer including data input and output capacity, processing circuitry, memory circuitry and an executable program for controlling engine functions. The ECU receives signals from various sensors coupled to various components of the vehicle engine.

Fuel is delivered to the combustion chamber by a high pressure fuel system which typically includes a fuel tank, a fuel pump and a fuel rail. The amount of fuel injected into the chamber is proportional to the pulse width of a signal from the ECU. Thus, an effector which is a component of a fuel injection system may include the ECU, and a control signal to the ECU may direct the fuel injection system to deliver less fuel to the combustion chamber, resulting in reduced engine torque and lower engine speed. Alternatively, fuel supply to one or more cylinders may be shut off completely to reduce engine power. A speeding vehicle may be brought into compliance with the speed limit by controlling fuel injection.

In a further example, an effector includes a component of an engine airflow intake system. In a typical vehicle having an internal combustion engine, activating the accelerator pedal is effective to introduce more air into the combustion chambers, increasing engine torque and thus engine speed. The accelerator pedal may be mechanically coupled to an air intake valve such that depressing the pedal opens the valve and increases engine air intake. Alternatively, the accelerator pedal may be coupled to an air intake valve electronically, such as by a sensor which senses the position of the pedal and interpolates a desired increase in speed from the position. A signal to an effector which is a component of an engine airflow intake system may uncouple pedal position from air intake, such that the operator of the vehicle is no longer able to increase the speed of the vehicle. In one embodiment, a second throttle valve is included, controlled by the ECU and a control signal from the electronic device included in a system of the present invention.

An effector is optionally a component of the braking system of a motorized vehicle. A signal to a component of the braking system is effective to decrease the speed of the vehicle. For example, hydraulic pressure may be increased in a brake line so as to activate braking in one or more brakes. The effect of accelerator pedal depression by the vehicle operator is optionally uncoupled from air intake in conjunction with activation of braking, so as to more effectively control speed of the vehicle.

In a further option, an effector is a component of the ignition system of the vehicle. For example, a control signal may inhibit spark or retard spark timing to one or more cylinders in an internal combustion engine. Thus, for example, voltage supplied to one or more spark plugs is decreased or eliminated in order to decrease combustion and thereby decrease engine torque and engine speed.

In one embodiment, the effector is actuatable to turn off the engine of the motorized vehicle. The engine may be automatically restarted once the vehicle is in compliance with the regulation.

An effector may further be operative to inform a driver regarding a regulation or emergency vehicle command. In one embodiment, an effector includes an audio system of the motorized vehicle and a control signal is effective to direct emission of audio information informing the driver of the approach of an emergency vehicle. A driver may also be informed of directions and commands issued by the operator and/or passengers in an emergency vehicle by emission of audio information. For example, a control signal may be effective to change a radio station to an emergency broadcast frequency for emission of information directed to the operator of the motorized vehicle. A control signal may further be operative to activate the radio if required. Alternatively, a specialized audio system may be included in a motorized vehicle for responding to a control signal. Such an audio system may be dedicated to function in response to a signal emitter and a control signal.

A vehicle operator may be given an amount of time in which to respond to the audio information and bring the vehicle into compliance with a particular regulation and/or command. Where the vehicle is not brought into compliance, a control signal is communicated to an effector to automatically bring the vehicle into compliance.

In a further embodiment, an effector operative to inform a driver regarding a regulation or command is a visual display, such as a continuous or blinking light in the driver's vehicle. Again, the driver may be given a period of time to respond to the visual display and bring the vehicle into compliance with particular regulation and/or command. Where the vehicle is not brought into compliance, a control signal is communicated to an effector to automatically bring the vehicle into compliance.

While systems and processes of the present invention are described herein primarily with reference to slowing a speeding vehicle down to bring it into compliance with a speed limit, it is appreciated that at least some of the above controls may be used to increase the speed of a vehicle if desired.

In a further embodiment, an effector is a component of a steering system of a motorized vehicle. In particular, off-road vehicles may be controlled by a control signal to the steering system such that the vehicle turns to avoid a hazard or restricted area. A control signal effective to turn a vehicle may be used in conjunction with a control signal effective to activate and effector to change the speed of the vehicle.

A process for automatically bringing a motorized vehicle into compliance with a motorized vehicle regulation is provided by the present invention which includes providing a signal receiver in contact with a motorized vehicle and receiving a signal from a signal emitting device, such that the signal is received by the signal receiver in data communication with an electronic device disposed in the motorized vehicle. The signal contains data relating to a motorized vehicle regulation, directly or indirectly. The electronic device has data input and output capacity, processing circuitry, memory circuitry and an executable program for analysis of the data from the signal emitter device to determine whether the motorized vehicle is in compliance with the motorized vehicle regulation and, where the motorized vehicle is not in compliance with the regulation, for generating a control signal. Thus, an inventive process further includes determining whether the motorized vehicle is or is not in compliance with the motorized vehicle regulation. Such a determination may be made by comparison of the current state of the vehicle with the regulation. For example, where the regulation is a speed limit, the actual speed of the vehicle is compared with the speed limit. If the vehicle is not in compliance with the regulation, a control signal is generated which is effective to activate an effector and automatically bring the motorized vehicle into compliance with the motorized vehicle-regulation.

Figure 3:
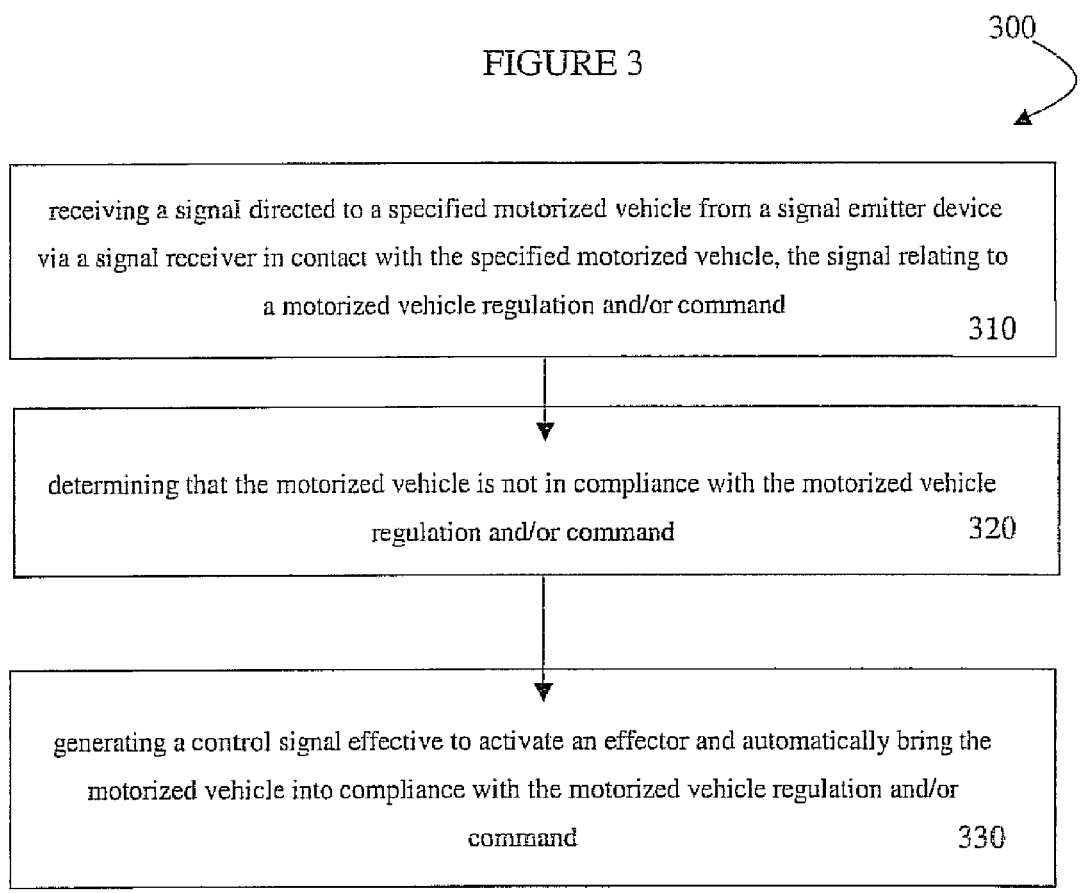
FIG. 3 is a flowchart illustrating a process according to an embodiment of the present invention.

FIG. 3 illustrates a process of the present invention in the form of a flow chart. Included in an inventive process 300 is receiving a signal directed specifically to a motorized vehicle from a signal emitter device via a signal receiver in contact with a motorized vehicle, shown at 310. Further included at 320 is determining that the motorized vehicle is not in compliance with the motorized vehicle regulation. In such a case an inventive method includes generating a control signal effective to activate an effector and automatically bring the motorized vehicle into compliance with the motorized vehicle regulation, as shown at 330.

Inventive systems and processes may be implemented for a variety of uses. One embodiment of an inventive system is directed to control of vehicles which are part of a fleet of commercial vehicles, such as delivery trucks or rental vehicles. In such an embodiment, a plurality of vehicles is provided with a signal receiver and an electronic device as described.

Inventive systems and processes may be used in conjunction with specific populations of vehicle operators. For example, an inventive system used in methods of training inexperienced vehicle operators and/or methods of restricting the behavior of vehicle operators who have previously ignored or exceeded the limits set by regulations relating to motorized vehicles, particularly speed limits.

Any patents or publications mentioned in this specification are incorporated herein by reference to the same extent as if each individual publication is specifically and individually indicated to be incorporated by reference.

The systems and processes described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

I claim:

1. A system for automatically bringing a motorized vehicle into compliance with a motorized vehicle regulation, comprising:

a signal receiver disposed in contact with a motorized vehicle for receiving a signal directed specifically to the motorized vehicle from a signal emitter device, the signal containing data relating to a motorized vehicle regulation; and
  an electronic device disposed in contact with the motorized vehicle, the electronic device in data communication with the signal receiver, the electronic device having data input and output capacity, processing circuitry, memory circuitry and an executable program for analysis of the data from the signal emitter device to determine whether the motorized vehicle is in compliance with the motorized vehicle regulation and, where the motorized vehicle is not in compliance with the regulation, for generating a control signal to control an effector responsive to the control signal, wherein response of the effector to the control signal automatically brings the motorized vehicle into compliance with the motorized vehicle regulation.

2. The system of claim 1 wherein the signal emitter device is a radio frequency identification tag and the signal receiver is a radio frequency identification reader.

3. The system of claim 1 wherein the signal receiver is a radio frequency identification tag and the signal emitter device is a radio frequency identification reader.

4. The system of claim 1 wherein the motorized vehicle regulation is a speed limit.

5. The system of claim 1 wherein the effector is a component of a braking system of the motorized vehicle.

6. The system of claim 1 wherein the effector is a component of a fuel injection system of the motorized vehicle.

7. The system of claim 1 wherein the effector is a component of an engine airflow intake system of the motorized vehicle.

8. The system of claim 1 wherein the elector is activated to inhibit spark supply to a combustion chamber the motorized vehicle.

9. The system of claim 1 wherein the elector is activated to turn off the engine of the motorized vehicle.

10. The system of claim 1 wherein the effector is activated to disable an input from an operator of the motorized vehicle.

11. The system of claim I wherein the signal emitter device is disposed in an emergency vehicle.

12. The system of claim 11 wherein the emergency vehicle is selected from the group consisting of a police vehicle, an ambulance, a fire response vehicle and a government agency vehicle.

13. A process for automatically bringing a motorized vehicle into compliance with a motorized vehicle regulation, comprising:

receiving a signal directed specifically to a motorized vehicle from a signal emitter device, the signal receiver in contact with the motorized vehicle, the signal containing data relating to a motorized vehicle regulation, the signal receiver in data communication with an electronic device disposed in contact with the motorized vehicle, the electronic device having data input and output capacity, processing circuitry, memory circuitry and an executable program for analysis of the data to determine whether the motorized vehicle is in compliance with the motorized vehicle regulation and, where the motorized vehicle is not in compliance with the regulation, for generating a control signal;
  determining that the motorized vehicle is not in compliance with the motorized vehicle regulation; and
  generating a control signal effective to activate an effector thereby automatically bringing the motorized vehicle into compliance with the motorized vehicle regulation.

14. The process of claim 13 wherein the control signal activates a braking system of the vehicle.

15. The process of claim 13 wherein the control signal disables operator initiated activation of a vehicle accelerator.

16. A system for automatically controlling an off-road motorized vehicle, comprising:
  a signal receiver disposed in contact with an off-road motorized vehicle for receiving a signal directed specifically to off-road motorized vehicle from a signal emitter device, the signal containing data relating to a hazard or restricted area; and
  an electronic device disposed in contact with the off-road motorized vehicle, the electronic device in data communication with the signal receiver, the electronic device having data input and output capacity, processing circuitry, memory circuitry and an executable program for analysis of the data from the signal emitter device to determine whether the motorized vehicle is in the vicinity of the hazard and, where the motorized vehicle is in the vicinity of the hazard or restricted area, for generating a control signal to control an effector responsive to the control signal, wherein response of the effector to the control signal automatically controls the off-road motorized vehicle so as to avoid the hazard or restricted area.

17. The system of claim 16 wherein the off-road motorized vehicle is selected from the group consisting of: a marine vehicle, a wheeled off-road vehicle and a snowmobile.

18. The system of claim 16 further comprising a signal emitter device for transmitting a signal containing data relating to a regulation, hazard or restricted area.

* * * * *

UNITED STATES PATENT AND TRADEMARK OFFICE
CERTIFICATE OF CORRECTION

PATENT NO. : 7,552,004 B2  
APPLICATION NO. : 11/400443  
DATED : June 23, 2009  
INVENTOR(S) : Ghassan Brikho Page 1 of 1

It is certified that error appears in the above-identified patent and that said Letters Patent is hereby corrected as shown below:

Column 4, line 61, replace "240" with --220--

Column 8, line 28, replace "vehicle-regulation" with --vehicle regulator--

Column 9, line 35, replace "elector" with --effector--

Column 9, line 38, replace "elector" with --effector--

Column 9, line 42, replace "I" with --1--

Column 9, line 45, replace "of" with --of:--

Signed and Sealed this

Fifteenth Day of September, 2009

David J. Kappos  
*Director of the United States Patent and Trademark Office*